R. C. CHARLTON.
ICE SAW.
APPLICATION FILED APR. 24, 1915.
1,160,843.
Patented Nov. 16, 1915.
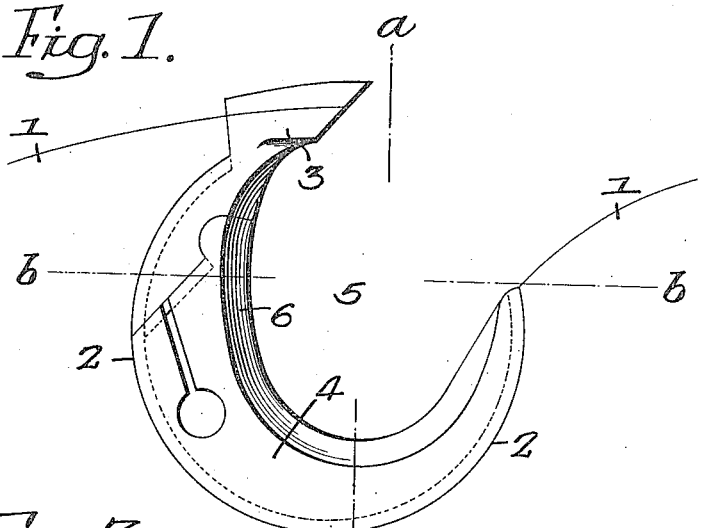
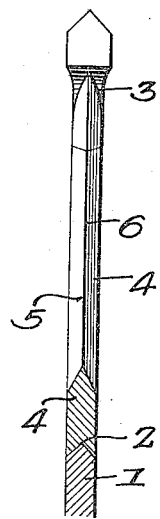
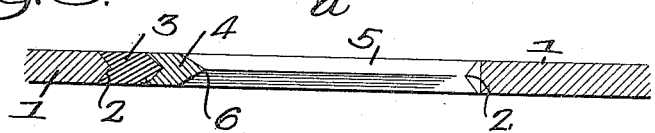
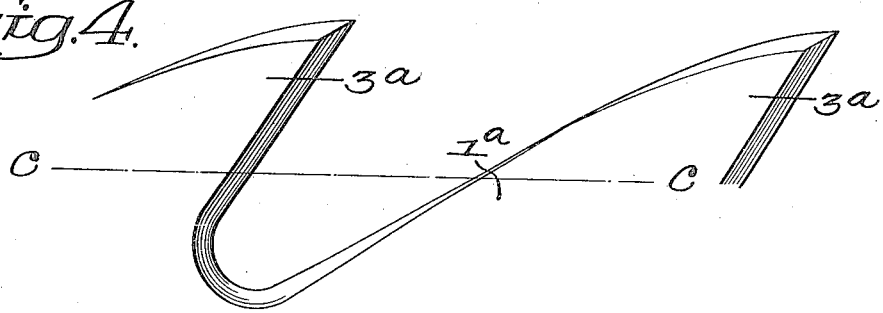
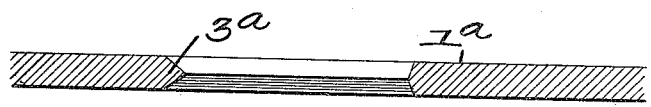
Inventor —
Richard C. Charlton,
by his Attorneys —

UNITED STATES PATENT OFFICE.

RICHARD C. CHARLTON, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

ICE-SAW.

1,160,843. Specification of Letters Patent. Patented Nov. 16, 1915.

Application filed April 24, 1915. Serial No. 23,644.

*To all whom it may concern:*

Be it known that I, RICHARD C. CHARLTON, a citizen of the United States, residing in Philadelphia, Pennsylvania, have invented certain Improvements in Ice-Saws, of which the following is a specification.

My invention relates to that type of saw used in cutting ice in water.

One object of the invention is to prevent the saw from throwing the water and the particles of ice.

A further object of the invention is to design the saw so that the water and the particles of ice will be deflected laterally toward the side of the blade, which materially reduces the friction.

These objects and other advantageous ends I attain in the following manner reference being had to the accompanying drawings, in which:

Figure 1 is a side view of a section of a circular saw having a detachable tooth and illustrating my invention; Fig. 2 is a sectional view on the line $a$—$a$, Fig. 1; Fig. 3 is a sectional view on the line $b$—$b$, Fig. 1; Fig. 4 is a side view of a section of a circular saw showing my invention as applied to an integral tooth and Fig. 5 is a sectional view on the line $c$—$c$, Fig. 4.

Referring to the drawings, 1 is the blade of the saw having a series of openings 2 for the reception of a tooth 3 and the holder 4. The tooth and the holder may be of any type desired without departing from the essential features of the invention. In fact, the tooth and the holder may be made in one piece or the tooth may be made integral with the body of the saw, as in Figs. 4 and 5, in which 1ª is the body and 3ª is the tooth. In front of the tooth is a gullet 5 into which the chips and sawdust pass as the saw cuts into the material. In general practice the rear wall of the gullet, viz., the portion 6, is usually flat as the purpose is to carry the sawdust in wood saws to a point outside of the kerf where it is discharged but in ice saws, particularly circular saws which cut the ice while in the water, this flat surface at the rear of the gullet has been found to interfere materially with the speed of the saw and it has also been found that it requires a certain amount of power to drive the saw and this flat surface acts as a blade to force the water out at a great distance. Therefore, I have found that by beveling the wall 6 of the throat, as indicated in the drawings, toward each side of the center that this beveled surface cuts into the water and displaces it laterally and in practice it has been found that this beveled surface materially reduces the power necessary to drive the saw and prevents, to a considerable extent, the throwing of the water from the saw. The beveled edge 6 is in no sense a cutting edge. The cutting is accomplished by the end of the tooth. It is merely a means for deflecting the water to allow the saw to be run with less power than heretofore.

I claim:

1. The combination in an ice saw, of a blade having a series of teeth; a gullet in front of each tooth, the rear wall of the gullet being beveled toward the side for the purpose of displacing the water through which the saw is driven.

2. The combination of a saw blade having a recess therein; a detachable tooth mounted in the recess; a holder, also mounted in the recess, and arranged to lock the tooth in position, the forward edge of the holder being beveled below the cutting edge of the tooth so as to deflect the water laterally as the saw is driven therethrough.

3. The combination in an ice saw, of a blade having a series of teeth and a deep gullet in front of each tooth, the rear wall of the gullets being beveled toward each side, forming a central rib which acts to deflect the water as the saw cuts the ice.

RICHARD C. CHARLTON.

Copies of this patent may be obtained for five cents each, by addressing the "Commissioner of Patents, Washington, D. C."